US011959321B2

(12) United States Patent
Vander Bent, Jr. et al.

(10) Patent No.: US 11,959,321 B2
(45) Date of Patent: Apr. 16, 2024

(54) SLIDING DOOR SYSTEM WITH DUAL TRACK ASSEMBLIES

(71) Applicant: PGT Innovations, Inc., North Venice, FL (US)

(72) Inventors: Kenneth John Vander Bent, Jr., Bradenton, FL (US); Kurt Karussi, Osprey, FL (US)

(73) Assignee: PGT Innovations, Inc., North Venice, FL (US)

( * ) Notice: Subject to any disclaimer, the term of this patent is extended or adjusted under 35 U.S.C. 154(b) by 162 days.

(21) Appl. No.: 17/378,036

(22) Filed: Jul. 16, 2021

(65) Prior Publication Data

US 2021/0340797 A1 Nov. 4, 2021

Related U.S. Application Data

(63) Continuation of application No. 16/227,574, filed on Dec. 20, 2018, now Pat. No. 11,098,511.

(51) Int. Cl.

*E05D 15/06* (2006.01)
*E05D 15/58* (2006.01)
*E06B 3/50* (2006.01)

(52) U.S. Cl.

CPC ......... *E05D 15/0604* (2013.01); *E05D 15/58* (2013.01); *E06B 3/5072* (2013.01); *E06B 3/509* (2013.01); *E05Y 2900/132* (2013.01)

(58) Field of Classification Search

CPC ... E05D 15/58; E05D 15/0604; E06B 3/5072; E06B 3/509; E05Y 2900/132
See application file for complete search history.

(56) References Cited

U.S. PATENT DOCUMENTS 3,002,218 A 10/1961 Hollansworth
3,142,095 A 7/1964 Sawyer
3,293,801 A 12/1966 Henning
(Continued)

FOREIGN PATENT DOCUMENTS

AU 2003231726 3/2004
AU 2011286171 2/2012
(Continued)

OTHER PUBLICATIONS

Vander Bent Jr., Kenneth John; Non-Final Office Action for U.S. Appl. No. 17/378,876, filed Jul. 19, 2021, dated Sep. 13, 2022, 27 pgs.

(Continued)

*Primary Examiner* — Justin B Rephann
(74) *Attorney, Agent, or Firm* — Snell & Wilmer L.L.P

(57) ABSTRACT

A sliding door assembly includes a track assembly comprising an inner track component, and outer track component, and a central track component, the inner track component and the central track component defining an inner track, the outer track component and the central track component defining an outer track; a pivot assembly engaged with and movable along the inner track; a sliding door pivotably mounted to the pivot assembly; and a locking pin coupled to the sliding door and movable between an extended configuration and a retracted configuration, wherein, in the extended configuration, the locking pin is engaged with and movable along the outer track.

21 Claims, 6 Drawing Sheets

(56) References Cited

U.S. PATENT DOCUMENTS

| | | | | |
|---|---|---|---|---|
| 3,300,897 | A | 1/1967 | Wikkerink | |
| 3,303,612 | A | 2/1967 | Baker | |
| 3,464,159 | A | 9/1969 | Hewitt et al. | |
| 3,654,732 | A | 4/1972 | Schacht | |
| 3,722,028 | A | 3/1973 | Schoenbrod | |
| 3,810,330 | A | 5/1974 | Daggy | |
| 3,826,044 | A | 7/1974 | Armstrong | |
| 3,925,933 | A | 12/1975 | Reuter | |
| 3,957,101 | A | 5/1976 | Kempel | |
| 4,064,593 | A | 12/1977 | Helmick | |
| 4,387,760 | A | 6/1983 | Greschbach | |
| 4,438,594 | A | 3/1984 | Bunzl | |
| 5,031,274 | A * | 7/1991 | Eutebach | E05F 3/225 16/229 |
| 5,217,262 | A | 6/1993 | Kurosaki | |
| 5,273,328 | A | 12/1993 | Kurosaki | |
| 5,394,648 | A * | 3/1995 | Kordes | E05D 15/48 49/177 |
| 5,486,026 | A * | 1/1996 | Borgardt | E05B 65/0876 49/141 |
| 5,647,423 | A | 7/1997 | Harms | |
| 5,749,172 | A | 5/1998 | Isopahkala | |
| 5,984,381 | A | 11/1999 | Yamagishi | |
| 5,997,056 | A | 12/1999 | Yamagishi | |
| 6,422,287 | B1 * | 7/2002 | Wilke | E05D 15/58 160/195 |
| 6,618,994 | B1 | 9/2003 | Nussbaum | |
| 6,834,703 | B2 | 12/2004 | Pacholke et al. | |
| 6,955,205 | B2 | 10/2005 | Lewis | |
| 7,861,475 | B2 | 1/2011 | Sprague | |
| 8,381,443 | B2 | 2/2013 | Smith et al. | |
| 8,443,549 | B2 | 5/2013 | Salvietti et al. | |
| 8,756,865 | B2 | 6/2014 | Nicholson et al. | |
| 8,806,807 | B2 | 8/2014 | Rees | |
| 9,194,172 | B2 | 11/2015 | Rees | |
| 9,745,787 | B2 | 8/2017 | Conley et al. | |
| 10,280,678 | B1 | 5/2019 | Rendon, Jr. et al. | |
| 10,415,289 | B2 | 9/2019 | Hailey et al. | |
| 10,718,143 | B2 | 7/2020 | Tuminella et al. | |
| 10,954,707 | B2 | 3/2021 | Hailey et al. | |
| 11,098,511 | B2 | 8/2021 | Vander Bent, Jr. et al. | |
| 11,098,514 | B2 | 8/2021 | Vander Bent, Jr. et al. | |
| 11,603,694 | B2 | 3/2023 | Vander Bent, Jr. et al. | |
| 2005/0284024 | A1 | 12/2005 | Bjorkman et al. | |
| 2010/0243179 | A1 | 9/2010 | Burggraaf et al. | |
| 2011/0094161 | A1 | 4/2011 | Rees | |
| 2012/0073205 | A1 | 3/2012 | Hamaker et al. | |
| 2014/0083013 | A1 | 3/2014 | Nicholson | |
| 2014/0150209 | A1 | 6/2014 | Tidwell | |
| 2014/0352220 | A1 | 12/2014 | Rees | |
| 2016/0251885 | A1 * | 9/2016 | Conley | E05F 11/42 49/127 |
| 2017/0204646 | A1 | 7/2017 | Tomlinson | |
| 2019/0055768 | A1 | 2/2019 | Hailey et al. | |
| 2019/0264484 | A1 | 8/2019 | Tuminella et al. | |
| 2020/0199924 | A1 | 6/2020 | Vander Bent, Jr. et al. | |
| 2020/0199925 | A1 | 6/2020 | Vander Bent, Jr. et al. | |
| 2021/0340800 | A1 | 11/2021 | Vander Bent, Jr. et al. | |
| 2021/0340801 | A1 | 11/2021 | Vander Bent, Jr. et al. | |

FOREIGN PATENT DOCUMENTS

| | | |
|---|---|---|
| AU | 2009200126 | 11/2015 |
| CH | 674544 | 6/1990 |
| CN | 106522766 | 3/2017 |
| EP | 1746234 | 1/2007 |
| EP | 3075938 | 10/2016 |
| GB | 2506968 | 4/2014 |
| GB | 2532795 | 6/2016 |
| KR | 20080053259 | 6/2008 |
| WO | 2009145641 | 12/2009 |
| WO | 2016003353 | 1/2016 |
| WO | 2016028713 | 2/2016 |

OTHER PUBLICATIONS

Vander Bent Jr., Kenneth John; Non-Final Office Action for U.S. Appl. No. 17/378,895, filed Jul. 19, 2021, dated Aug. 19, 2022, 28 pgs.

Panoramic Doors UK; Article entitled: “Panoramic Doors Duyers Guide”, accessed on Jun. 20, 2018, 16 pgs.

Vander Bent Jr., Kenneth John; Corrected Notice of Allowance for U.S. Appl. No. 16/227,574, filed Dec. 20, 2018, dated Jul. 22, 2021, 6 pgs.

Vander Bent Jr., Kenneth John; Non-Final Office Action for U.S. Appl. No. 16/227,574, filed Dec. 20, 2018, dated Jan. 8, 2021, 21 pgs.

Vander Bent Jr., Kenneth John; Requirement for Restriction/Election for U.S. Appl. No. 16/227,574, filed Dec. 20, 2018, dated Nov. 2, 2020, 8 pgs.

Vander Bent Jr., Notice of Allowance for U.S. Appl. No. 16/227,574, filed Dec. 20, 2018, dated Apr. 19, 2021, 9 pgs.

Warmcore; Brochure for Warmcore Folding Sliding Doors, located at <http://www.doorsandwindowsexeter.co.uk/uploads/8/1/9/8/8198075/warmcore_retail_brochure.pdf>, published on Nov. 28, 2017, 32 pgs.

Vander Bent Jr., Kenneth John; Corrected Notice of Allowance for U.S. Appl. No. 16/227,605, filed Dec. 20, 2018, dated Jul. 22, 2021, 6 pgs.

Vander Bent Jr., Kenneth John; Non-Final Office Action for U.S. Appl. No. 16/227,605, filed Dec. 20, 2018, dated Jan. 11, 2021, 19 pgs.

Vander Bent Jr., Kenneth John; Requirement for Restriction/Election for U.S. Appl. No. 16/227,605, filed Dec. 20, 2018, dated Nov. 2, 2020, 8 pgs.

Vander Bent, Jr., Kenneth John; Notice of Allowance for U.S. Appl. No. 16/227,605, filed Dec. 20, 2018, dated Apr. 19, 2021, 12 pgs.

Vander Bent Jr., Kenneth John; Notice of Allowance for U.S. Appl. No. 17/378,895, filed Jul. 19, 2021, dated Dec. 7, 2022, 13 pgs.

Vander Bent Jr., Kenneth John; Notice of Allowance for U.S. Appl. No. 17/378,876, filed Jul. 19, 2021, dated Mar. 6, 2023, 17 pgs.

* cited by examiner

SLIDING DOOR SYSTEM WITH DUAL TRACK ASSEMBLIES

CROSS-REFERENCE TO RELATED APPLICATIONS

The present application is a continuation of U.S. application Ser. No. 16/227,574, filed Dec. 20, 2018, which is hereby specifically incorporated by reference herein in its entirety.

TECHNICAL FIELD

This disclosure relates to sliding doors. More specifically, this disclosure relates to a sliding door system comprising a pair of dual track assemblies.

BACKGROUND

Sliding door systems can comprise multiple sliding doors, and the sliding doors can stack together at varying depths to create an open space in the sliding door system. Typically, each individual sliding door requires its own upper track and lower track to slide along. As the quantity of sliding doors in a sliding door system increases, the quantity of upper and lower tracks required and the depth of the sliding door system can increase. As such, multi-door sliding door systems requiring a high quantity of upper and lower tracks can be expensive to manufacture and can occupy an inconvenient amount of space at the installation site.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is a sliding door assembly comprising a track assembly comprising a track assembly comprising a track assembly comprising a first track and a second track; a pivot assembly comprising a pivot carriage and a pivot mechanism engaging the pivot carriage, the pivot carriage configured to move along the first track; a locking carriage configured to move along the second track; and a sliding door comprising a door body and a locking pin, the locking pin removably engaging the locking carriage, and the door body configured to pivot at the pivot assembly relative to the track assembly.

Also disclosed is a sliding door system comprising an upper track assembly comprising a first upper track and a second upper track; a lower track assembly comprising a first lower track and a second lower track; a first sliding door comprising a first pivot assembly, a first upper locking pin, and a first lower locking pin, the first pivot assembly extending through the first upper track and first lower track, the first upper locking pin removably extending through the second upper track, and the first lower locking pin removably extending through the second lower track; and a second sliding door comprising a second pivot assembly, a second upper locking pin, and a second lower locking pin, the second pivot assembly extending through the first upper track and first lower track, the second upper locking pin removably extending through the second upper track, and the second lower locking pin removably extending through the second lower track.

Also disclosed is a method for using a sliding door system, the method comprising providing a track assembly, the track assembly comprising a first track and a second track adjacent to the first track, providing a sliding door, the sliding door comprising a door body, a pivot assembly, and a locking pin, the pivot assembly engaging the first track and the locking pin engaging the second track; disengaging the locking pin from the second track; and pivoting the door body at the pivot assembly relative to the track assembly.

A sliding door assembly is disclosed, the sliding door assembly comprising a track assembly comprising an inner track component, and outer track component, and a central track component, the inner track component and the central track component defining an inner track, the outer track component and the central track component defining an outer track; a pivot assembly engaged with and movable along the inner track; a sliding door pivotably mounted to the pivot assembly; and a locking pin coupled to the sliding door and movable between an extended configuration and a retracted configuration, wherein, in the extended configuration, the locking pin is engaged with and movable along the outer track.

Additionally, disclosed is a sliding door assembly comprising a track assembly comprising an inner track, and outer track, and a guide panel, the guide panel defining an inner slot aligned with the inner track and an outer slot aligned with the outer track; a pivot assembly extending through the inner slot of the guide panel, the pivot assembly engaged with and movable along the inner track; a sliding door comprising a door body pivotably mounted to the pivot assembly, wherein the guide panel is oriented between the door body and the inner and outer tracks; and a locking assembly coupled to the sliding door and extending through the outer slot of the guide panel, the locking assembly engaged with and movable along the outer track.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
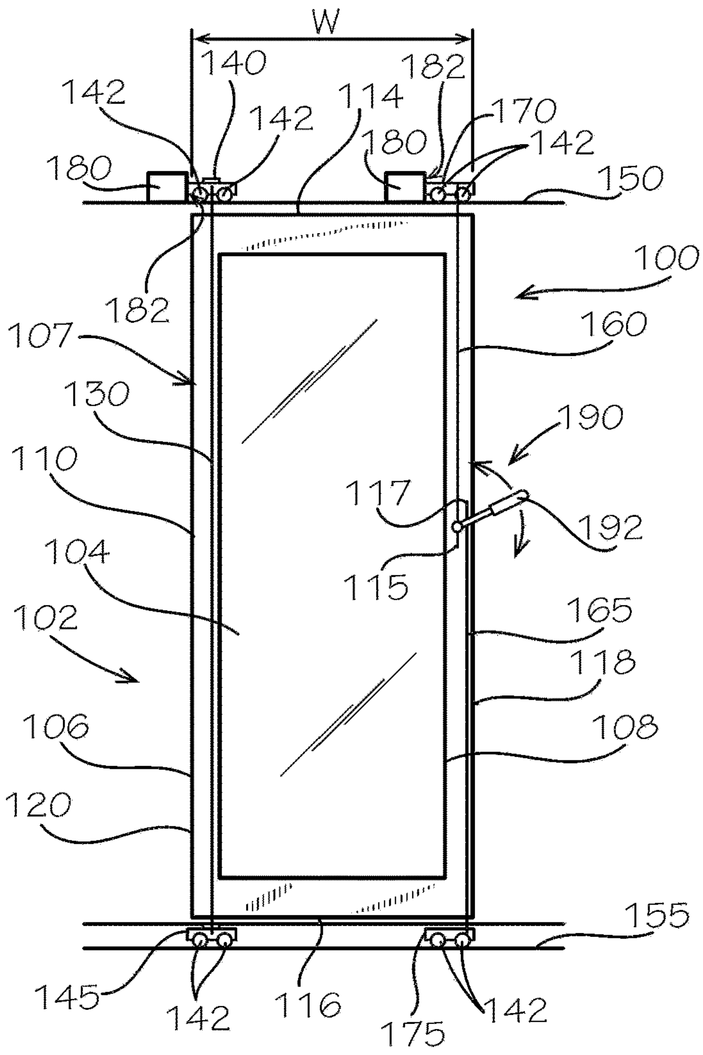
FIG. 1 is a front view of a sliding door, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms “a,” “an” and “the” include plural referents unless the context clearly dictates otherwise. Thus, for example, reference to “an element” can include two or more such elements unless the context indicates otherwise.

Ranges can be expressed herein as from “about” one particular value, and/or to “about” another particular value. When such a range is expressed, another aspect includes from the one particular value and/or to the other particular value. Similarly, when values are expressed as approximations, by use of the antecedent “about,” it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms “optional” or “optionally” mean that the subsequently described event or circumstance can or cannot occur, and that the description includes instances where said event or circumstance occurs and instances where it does not.

The word “or” as used herein means any one member of a particular list and also includes any combination of members of that list. Further, one should note that conditional language, such as, among others, “can,” “could,” “might,” or “may,” unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a sliding door system and associated methods, systems, devices, and various apparatus. Example aspects of the sliding door system can comprise a plurality of sliding doors, a dual upper track assembly, and a dual lower track assembly. It would be understood by one of skill in the art that the disclosed sliding door system is described in but a few exemplary aspects among many. No particular terminology or description should be considered limiting on the disclosure or the scope of any claims issuing therefrom.

FIG. 1 illustrates a first aspect of a sliding door assembly 1000 comprising a sliding door 100, according to the present disclosure. According to the present aspect, the sliding door 100 can define a door body 102. Example aspects of the door body 102 can comprise a window panel 104 and a door frame 106, as shown. In the present FIG. 1, the door frame 106 is illustrated as transparent for visibility into interior components, which will be described below. Example aspects of the door frame 106 can define an opening 108 extending from a front side 110 of the sliding door 100 to a back side 212 (shown in FIG. 2) of the sliding door 100. As shown, the window panel 104 can be received within the opening 108. Example aspects of the window panel 104 can be formed from a glass material to allow for visibility through the window panel 104. Furthermore, example aspects of the door frame 106 can be formed from a wood material. However, in other aspects, the window panel 104 and/or the door frame 106 can be formed from a number of other suitable materials or combination thereof, including, but not limited to, metals, plastics, composite materials, and the like. Furthermore, in other aspects, the sliding door 100 may not comprise the window panel 104, and in still other aspects, the sliding door 100 can comprise multiple window panels 104.

Example aspects of the window panel 104 can define a substantially rectangular shape, and the door frame 106 can define a substantially rectangular shape, as shown. In other aspects, the window panel 104 and/or the door frame 106 can define any other suitable shape. Furthermore, in other aspects, the window panel 104 and door frame 106 can each define a different shape. For example, in one aspect, the window panel 104 can define an oval shape and the door frame 106 can define a rectangular shape.

As shown, the sliding door 100 can define a top end 114, a bottom end 116, a right side 118, and a left side 120, relative to the orientation shown. Furthermore, a width W of the sliding door 100 can be defined extending from the right side 118 of the sliding door 100 to the left side 120 of the sliding door. Example aspects of the sliding door 100 can comprise a pivot assembly 107. In the present aspect, the pivot assembly 107 can comprise a pivot mechanism, such as a hinge rod 130. In other aspects, the pivot mechanism can comprise a bearing or any other suitable mechanism known in the art that can allow for pivotal movement. As shown, the hinge rod 130 can extend substantially vertically, relative to the orientation shown, through a hinge channel 238 (shown in FIG. 2) formed in the door frame 106. In example aspects, the hinge rod 130 and hinge channel 238 can extend from the top end 114 of the sliding door 100 to the bottom end 116, and can be oriented proximate to the left side 120 of the sliding door 100. Other aspects of the hinge rod 130 can be oriented proximate the right side 118 of the sliding door 100. The pivot assembly 107 can allow the door body 102 of the sliding door 100 to pivot about the hinge rod 130, or other pivot mechanism, between a closed position, as shown, and an open position, which will be described in further detail below.

According to example aspects, the pivot assembly 107 can further comprise an upper hinge carriage 140 and a lower hinge carriage 145. As shown, the hinge rod 130 can extend beyond the top and bottom ends 114, 116 of the sliding door 100. An upper end 232 (shown in FIG. 2) of the hinge rod 130 can engage the upper hinge carriage 140, and a lower end 434 (shown in FIG. 4A) of the hinge rod 130 can engage the lower hinge carriage 145. Example aspects of the sliding door assembly 1000 can further comprise an upper track assembly 150 and a lower track assembly 155. As shown, the upper hinge carriage 140 can comprise one or more wheels 142 for rolling along the upper track assembly 150, and the lower hinge carriage 145 can comprise one or more wheels 142 for rolling along the lower track assembly 155, as will be described in further detail below. In other aspects, any other suitable movement mechanism known in the art for rolling sliding, gliding, or otherwise moving the upper and lower hinge carriages 140,145 along the upper and lower track assemblies 150,155, respectively, can be used. Furthermore, in other aspects of the sliding door 100, the door body 102 can be fixed relative to the hinge rod 130, and the hinge rod 130 and door body 102 can pivot relative to the upper hinge carriage 140 and lower hinge carriage 145. Also, according to other aspects, the hinge rod 130 can be separated into an upper hinge rod and a lower hinge rod that is separate from the upper hinge rod.

The sliding door 100 can also comprise an upper locking pin 160 and a lower locking pin 165. In example aspects, each of the upper and lower locking pins 160,165 can extend in a substantially vertical direction, relative to the orientation shown. The upper locking pin 160 can extend through an upper locking channel 364 (shown in FIG. 3A) formed in the door frame 106, and the lower locking pin 165 can extend through a lower locking channel (not shown) formed in the door frame 106. As shown, in example aspects, each of the upper and lower locking pins 160,165 can be oriented proximate the right side 118 of the sliding door 100, opposite the hinge rod 130. In other aspects, the positioning of the upper and lower locking pins 160,165 and the hinge rod 130 can be switched. Furthermore, as illustrated, in example aspects, the upper locking channel 364 can be horizontally offset from the lower locking channel, relative to the orientation shown. The upper locking channel 364 can extend in a generally downward vertical direction, relative to the orientation shown, from the top end 114 of the sliding door 100 to a first intermediate point 115. The lower locking channel (not shown) can extend in a generally upward vertical direction, relative to the orientation shown, from the bottom end 116 of the sliding door 100 to a second intermediate point 117. Each of the first intermediate point and second intermediate point can be defined as a point between the top end 114 and the bottom end 116 of the sliding door 100. In other aspects, the upper locking channel 364 and/or lower locking channel (not shown) can extend through the door frame 106 from the top end 114 to the bottom end 116. According to example aspects, the upper and lower locking pins 160, 165 can be configured to slide within the upper locking channel 364 and lower locking channel, respectively.

According to example aspects, the upper locking pin 160 can extend beyond the top end 114 of the sliding door 100 and can be configured to removably engage an upper locking carriage 170. Similarly, the lower locking pin 165 can extend beyond the bottom end 116 of the door and can be configured to removably engage a lower locking carriage 175. Each of the upper and lower locking carriages 170,175 can comprise one or more wheels 142 for rolling along the upper track assembly 150 and the lower track assembly 155, respectively. According to example aspects, the upper track assembly 150 and/or lower track assembly 155 can comprise one or more stop blocks 180. Each of the stop blocks 180 can define a stop surface 182 for limiting the movement of the upper and lower hinge carriages 140,145 and/or the upper and lower locking carriages 170,175. Furthermore, each of the upper locking pin 160 and lower locking pin 165 can be selectively movable between an extended configuration, as shown, wherein the upper and lower locking pins 160,165 can be engaged with the upper and lower locking carriages 170,175, respectively, and a retracted configuration, wherein each of the upper and lower locking pins 160,165 can be disengaged from the upper and lower locking carriages 170,175, respectively.

The sliding door 100 can further comprise an actuator 190, such as the handle 192 depicted in the current aspect, for selectively actuating the upper and lower locking pins 160,165 between the extended configuration and the retracted configuration. As shown in FIG. 1, the handle 192 can be operably attached to each of the upper and lower locking pins 160,165. In one example aspect, the handle 192 can be pivotable between a raised orientation and a lowered orientation, as indicated by the directional arrows shown. In the lowered orientation, the handle 192 can push the upper and lower locking pins 160,165 into the upper and lower locking carriages 170,175, respectively, and in the raised orientation, the handle 192 can retract the upper and lower locking pins 160,165 from the upper and lower locking carriages 170,175. The actuator 190 can be user accessible such that a user can selectively move the upper and lower locking pins 160,165 between the engaged and retracted configurations, as desired. The extended configuration and retracted configuration of the upper and lower locking pins 160,165 are described in further detail below with respect to FIGS. 3A, 3B, 4A, and 4B.

Figure 2:
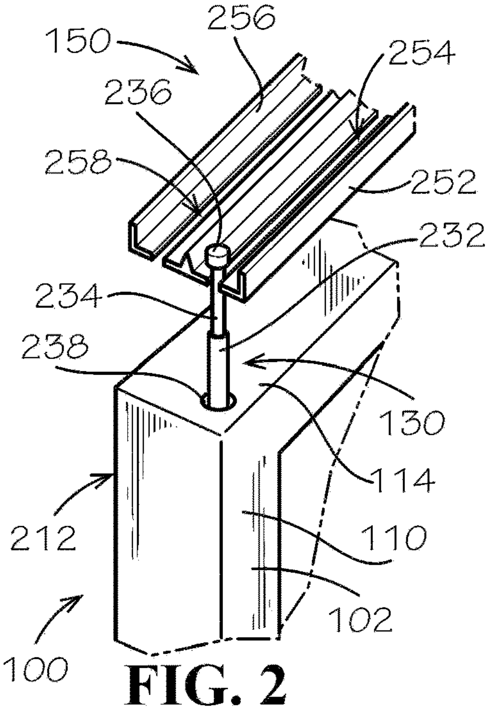
FIG. 2 is a top perspective view of a hinge rod of the sliding door of FIG. 1 engaged with an upper track assembly.

FIG. 2 illustrates a close-up perspective view of the hinge rod 130 and hinge channel 238 at the top end 114 of the sliding door 100. The hinge rod 130 can define a substantially cylindrical shape and the hinge channel 238 can define a substantially cylindrical shape. However, in other aspects, the hinge rod 130 and/or hinge channel 238 can define any other suitable shape that can allow the door body 102 to pivot about the hinge rod 130. Furthermore, as shown, in example aspects, the hinge channel 238 can be oriented proximate the front side 110 of the sliding door 100. In other aspects, the hinge channel 238 can be oriented proximate the back side 212 of the sliding door 100, or can be oriented centrally between the front and back sides 110,212.

FIG. 2 also illustrates the upper track assembly 150, according to an aspect of the present disclosure. The upper track assembly 150 can comprise an inner upper track 252 and an outer upper track 256. As shown, each of the inner upper track 252 and outer upper track 256 can extend about parallel along its length to the top end 114 of the sliding door 100 and can be positioned proximate to the same. Furthermore, in example aspects, the location of the inner upper track 252 can generally correspond to the location of the front side 110 of the sliding door 100, and the location of the outer upper track 256 can generally correspond to the location of the back side 212 of the door, as shown. The inner upper track 252 can define an inner upper slot 254 extending centrally along a length thereof, and the outer upper track 256 can define an outer upper slot 258 extending centrally along a length thereof.

According to example aspects, the hinge rod 130 can be substantially aligned with the inner upper slot 254 of the inner upper track 252. Furthermore, the upper end 232 of the hinge rod 130 can define a neck 234 and a cap 236, as shown. Example aspects of the neck 234 can define a width smaller than a width of the inner upper slot 254, such that the neck 234 can extend through the inner upper slot 254 and can be configured to slide within the inner upper slot 254. Example aspects of the cap 236 can define a width greater than the width of the inner upper slot 254, such that the cap 236 cannot pass through the inner upper slot 254, thereby retaining the hinge rod 130 in engagement with the inner upper slot 254. Moreover, the cap 236 at the upper end 232 of the hinge rod 130 can engage the upper hinge carriage 140 (shown in FIG. 1). The lower end 434 (shown in FIG. 4) of the hinge rod 130 can engage the lower hinge carriage 145 (shown in FIG. 1) in substantially the same manner. Example aspects of the upper hinge carriage 140 can roll along the inner upper track 252 to facilitate sliding the sliding door 100. Example aspects of the inner upper slot 254 can guide the hinge rod 130 as the upper hinge carriage 140 rolls along the upper track assembly 150.

Figure 3A:
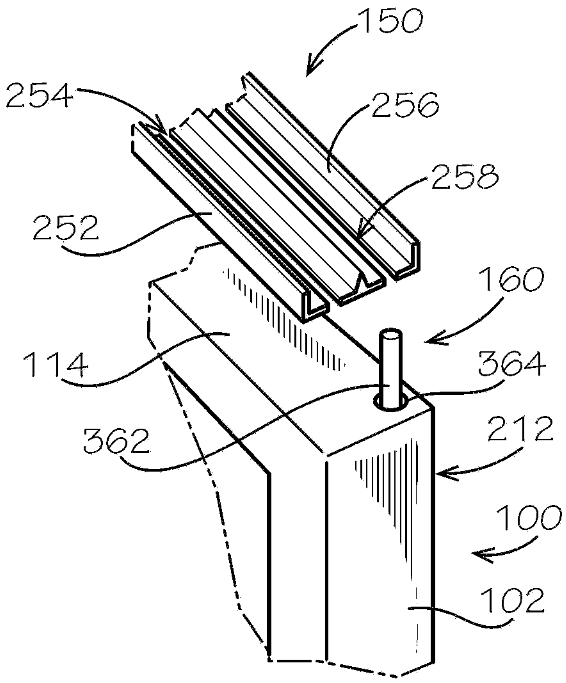
FIG. 3A is a top perspective view of an upper locking pin of the sliding door of FIG. 1 disengaged from the upper track assembly of FIG. 2.

FIG. 3A illustrates a close-up perspective view of the upper locking pin 160 and upper locking channel 364 at the top end 114 of the sliding door 100. As shown, in example aspects, the locking channel 364 can be oriented proximate the back side 212 of the sliding door 100; however, in other aspects, the upper locking channel can be oriented proximate the front side 110 of the sliding door or centrally between the front and back sides 110,212. Furthermore, the upper locking pin 160 can define a substantially cylindrical shape and the upper locking channel 364 can define a substantially cylindrical shape; however, in other aspects, the upper locking hinge and upper locking channel 364 can define any other suitable shape. According to example aspects, the lower locking pin 165 (shown in FIG. 1) and lower locking channel (not shown) can be configured substantially the same as the upper locking pin 160 and upper locking channel 364.

According to example aspects, the upper locking pin 160 can be substantially aligned with the outer upper slot 258 of the outer upper track 256. According to example aspects, an upper end 362 of the upper locking pin 160 can define a width smaller than a width of the outer upper slot 258, such that the upper end 362 can be configured to engage and disengage the outer upper slot 258, as desired, when actuated by the handle 192 (shown in FIG. 1) between the engaged and retracted configuration. When the upper locking pin 160 is in the extended configuration, the upper locking pin 160 can extend through the outer upper slot 258 and engage the upper locking carriage 170 (shown in FIG. 1), which can roll along the outer upper track 256. Example aspects of the outer upper slot 258 can serve as a guide for the upper locking pin 160 as the upper locking carriage 170 rolls along the upper track assembly 150. According to example aspects, the upper locking carriage 170 can roll along the outer upper track 256 in unison with the upper hinge carriage 140 (shown in FIG. 1) rolling on the inner upper track 252.

When the upper locking pin 160 is in the retracted configuration, the upper locking pin 160 can be disengaged from the upper locking carriage 170 and the outer upper slot 258, such that the upper locking pin 160 can clear the upper track assembly 150. With the upper locking pin 160 and lower locking pin 165 (shown in FIG. 1) both in the retracted configuration, the door body 102 can pivot about the hinge rod 130 (shown in FIG. 1), as will be described in further detail below with reference to FIGS. 5-6.

Figure 3B:
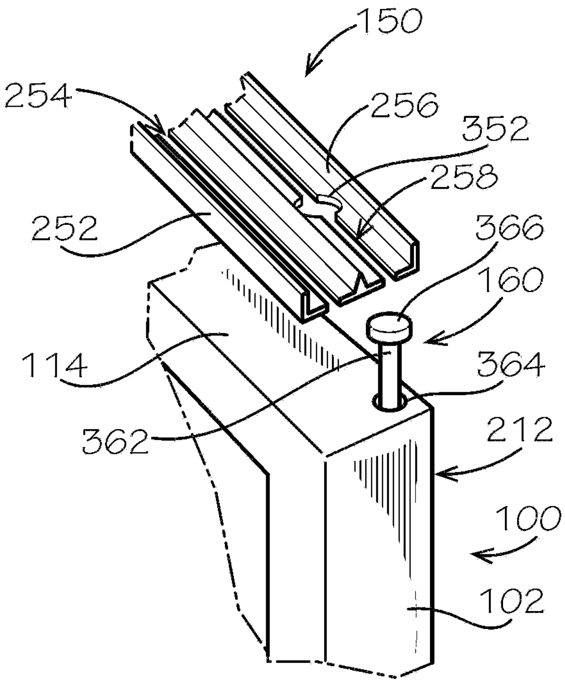
FIG. 3B is a top perspective view of the upper locking pin of the sliding door of FIG. 1 disengaged from the upper track assembly, according to another aspect of the present disclosure.

FIG. 3B illustrates another aspect of the upper locking pin 160 and the upper track assembly 150. In the present aspect, the upper track assembly 150 can define one or more holes 352 formed in the outer upper track 256 and intersecting the outer upper slot 258. In example aspects, the hole(s) 352 can define a width greater than a width of the outer upper slot 258, as illustrated.

In the present aspect, the upper locking pin 160 can comprise a head 366 positioned at the upper end 362. In example aspects, the width of the head 366 can be greater than the width of the outer upper slot 258, such that the head 366 cannot pass through the outer upper slot 258, thereby retaining the upper locking pin 160 in engagement with the outer upper slot 258. However, according to example aspects, the width of the head 366 can be smaller than the width of the hole 352, such that the head 366 can be configured to engage and disengage the outer upper slot 258 when aligned with one of the holes 352. The upper locking pin 160 thereby cannot disengage the outer upper slot 258 when the head 366 is not aligned with one of the holes 352.

As such, when the head 366 and the hole 352 are aligned, the handle 192 (shown in FIG. 1) can be actuated to move the upper locking pin 160 between the extended and retracted configurations. When the upper locking pin 160 is in the retracted configuration, the upper locking pin 160 and head 366 can be retracted from the outer upper slot 258, such that the upper locking pin 160 and head 366 can clear the upper track assembly 150. In still another aspect, the upper locking pin 160 can be replaced with a track engagement device (not shown). The track engagement device can extend beyond the top end 114 of the door body 102, and can be configured to removably engage the upper track assembly 150. Example aspects of the track engagement device can comprise a leg member extending substantially vertically upward from the door frame 102, relative to the orientation shown. An arm member of the track engagement device can extend in a substantially horizontal direction, relative to the orientation shown, at a distal end of the leg member. As such, the leg member and arm member can generally define a T-shaped track engagement device. According to example aspects, one or more wheels 142 can be connected to the arm member. The wheels 142 can be configured to engage the outer upper track 256 of the upper track assembly 150 to facilitate rolling along the outer upper track 256.

The track engagement device can be selectively movable between an engaged configuration, wherein the track engagement device can engage the outer upper track 256 of the upper track assembly 150, and a disengaged configuration, wherein the track engagement device can be disengaged from the outer upper track 256. For example, in the disengaged configured, the track engagement device can be extended further away from the door body 102, such that the arm member and wheels 142 can be elevated above and can clear the upper track assembly 150, such as by raising the track engagement device relative to the upper track assembly 150. In example aspects, the actuator 190 (shown in FIG. 1) can be configured to actuate the track engagement device between the engaged configured and disengaged orientation and to actuate the lower locking pin 165 between the extended configuration and the retracted configuration simultaneously. With the track engagement device in the disengaged configuration and the lower locking pin 165 in the retracted configuration, the door body 102 can pivot about the hinge rod 130 (shown in FIG. 1). In example aspects, in the disengaged configuration, the leg member of the track engagement device can abut a side of the upper track assembly 150, such that the door body 102 can pivot away from the upper track assembly 150 but cannot pivot past the upper track assembly 150.

Figure 4A:
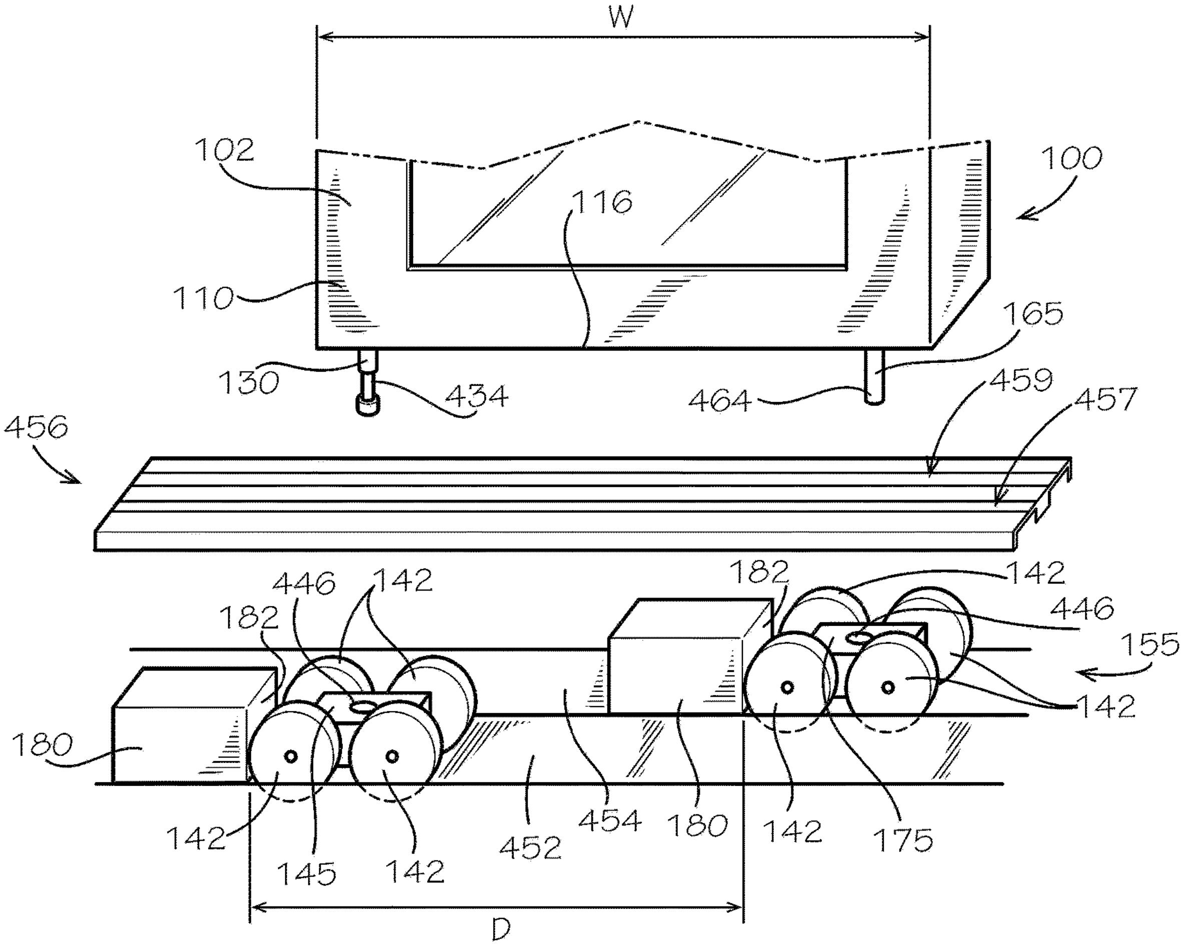
FIG. 4A is an exploded view of a bottom end of the sliding door of FIG. 1 and a lower track assembly.

FIG. 4A illustrates a close-up exploded view of the lower track assembly 155 and the bottom end 116 of the sliding door 100. In example aspects, the lower track assembly 155 can be situated on a support surface (e.g., a ground, a floor, etc.). In some aspects, the lower track assembly 155 can be recessed into the ground to provide a smooth floor transition from one side of the door 100 to the other. As shown, example aspects of the lower track assembly 155 can comprise an inner lower track 452 for supporting the lower hinge carriage 145 and an outer lower track 454 for supporting the lower locking carriage 175. In example aspects, the location of the inner lower track 452 can generally correspond to the location of the front side 110 of the sliding door 100, and the location of the outer lower track 454 can generally correspond to the location of the back side 212 (shown in FIG. 2) of the sliding door 100, as shown. As described above, each of the lower hinge carriage 145 and lower locking carriage 175 can comprise one or more wheels 142 to facilitate rolling along the inner and outer lower tracks 452,454, respectively. Furthermore, in some aspects, as shown, each of the inner lower track 452 and outer lower track 454 can comprise a stop block 180 for limiting the movement of the lower hinge carriage 145 and lower locking carriage 175, respectively. Furthermore, according to some example aspects, the stop surfaces 182 of the stop blocks 180 can define a distance D therebetween that can be less than the width W of the sliding door 100, as shown, or can be about equal to the width W of the sliding door 100. In other aspects, the distance between the stop surfaces 182 can be greater than the width W of the sliding door 100.

According to example aspects, the lower track assembly 155 can further comprise a lower guide panel 456. The lower guide panel 456 can be oriented above and spaced from the inner and outer lower track 452,454, relative to the orientation shown, such that the lower locking carriage 175 and lower hinge carriage 145 can be received therebetween, as shown. Example aspects of the lower guide panel 456 can define an inner lower slot 457 and an outer lower slot 459 extending centrally along a length thereof. According to example aspects, the inner lower slot 457 can be substantially aligned with the inner lower track 452 and the outer lower slot 459 can be substantially aligned with the outer lower track 454. Furthermore, the hinge rod 130 can be substantially aligned with inner lower slot 457 and the lower locking pin 165 can be substantially aligned with the outer lower slot 459. In other aspects however, the lower track assembly 155 may not comprise the guide panel 456.

Figure 4B:
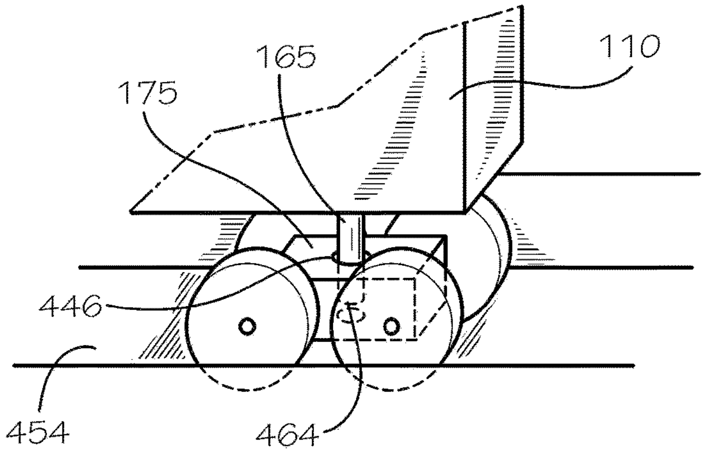
FIG. 4B is a top perspective view of a lower locking pin of the sliding door of FIG. 1 engaged with a lower locking carriage of the sliding door of FIG. 1.

According to example aspects, the lower end 434 of the hinge rod 130 can be configured substantially the same as the upper end 232 (shown in FIG. 2) of the hinge rod 130 described above with respect to FIG. 2. Furthermore, the lower locking pin 165 can be configured substantially the same as the upper locking pin 160 (shown in FIG. 1) described above with reference to FIG. 3A. In example aspects, each of the lower hinge carriage 145 and lower locking carriage 175 can define a recess 446 for receiving the lower end 434 of the hinge rod 130 and a lower end 464 of the lower locking pin 165, respectively. As such, the hinge rod 130 can extend through the inner lower slot 457 of the guide panel 456 to engage the recess 446 of the lower hinge carriage 145, and the lower locking pin 165 can extend through the outer lower slot 459 to removably engage the lower locking carriage 175 in the extended configuration. FIG. 4B illustrates the lower locking pin 165 engaged with the recess 446 of the lower locking carriage 175. Example aspects of the upper hinge carriage 140 (shown in FIG. 1) and upper locking carriage 170 (shown in FIG. 1) can each be similarly configured with a recess 446 for receiving the upper end 232 (shown in FIG. 2) of the hinge rod 130 and upper end 362 (shown in FIG. 2) of the upper locking pin 160 (shown in FIG. 1), respectively.

Referring back to FIG. 4A, according to example aspects, the inner lower slot 457 can guide the hinge rod 130 as the lower hinge carriage 145 rolls along the inner lower track 452 of the lower track assembly 155. Furthermore, the outer lower slot 459 can guide the lower locking pin 165 as the lower locking carriage 175 rolls along the outer lower track 454 of the lower track assembly 155 when the lower locking pin 165 is in the extended configuration. In the retracted configuration, the lower locking pin 165 can be disengaged from the lower locking carriage 175 and the outer lower slot 459, such that the lower locking pin 165 can clear the lower track assembly 155. When the lower locking pin 165 and upper locking pin 160 (shown in FIG. 1) are both in the retracted configuration, the door body 102 can pivot about the hinge rod 130, as will be described in further detail below with reference to FIGS. 5-6.

Figure 5:
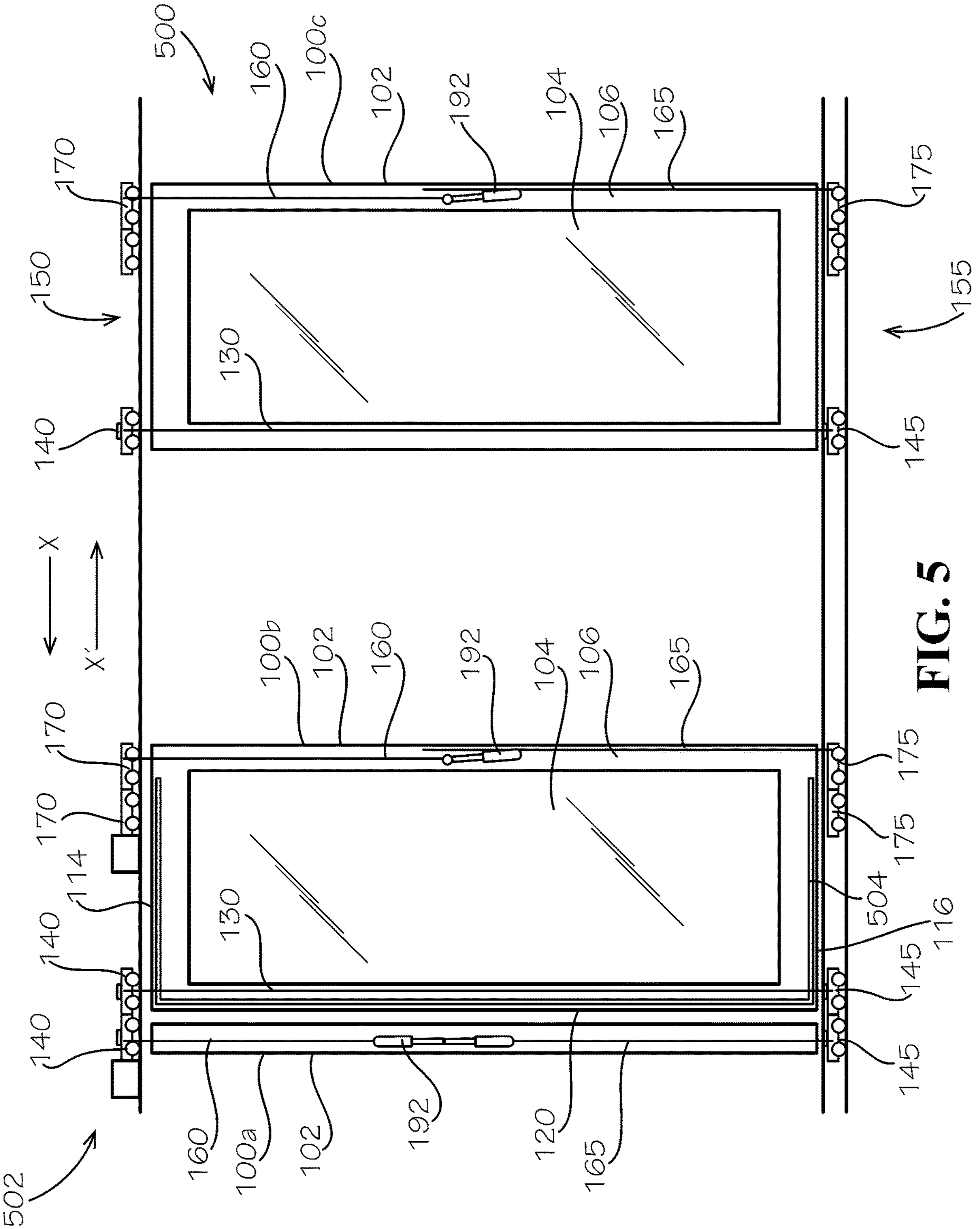
FIG. 5 is front view of a sliding door system, in accordance with one aspect of the present disclosure.

FIG. 5 illustrates an aspect of a sliding door system 500, according to the present disclosure. As shown, the sliding door system 500 can comprise a plurality of the sliding doors 100. For example, the sliding door system 500 can comprise a first sliding door 100*a*, a second sliding door 100*b*, and a third sliding door 100*c*, each of which can be substantially similar to the sliding door 100 of FIGS. 1-4B. Other aspects of the sliding door system 500 can comprise more or fewer sliding doors 100. Each of the sliding doors 100*a,b,c* can comprise the door body 102. The door body 102 can comprise the window panel 104 and the surrounding door frame 106. Furthermore, each of the sliding doors 100*a,b,c* can comprise the hinge rod 130 and the upper and lower hinge carriages 140,145 connected thereto. Each of the sliding doors 100*a,b,c* can also comprise the upper and lower locking pins 160,165 removably engagable with the upper and lower locking carriages 170, 175, respectively. Each of the upper hinge carriages 140 can roll along the inner upper track 252 (shown in FIG. 2) of the upper track assembly 150, and each of the upper locking carriages 170 can roll along the outer upper track 256 (shown in FIG. 2) of the upper track assembly 150. Furthermore, each of the lower hinge carriages 145 can roll along inner lower track 452 (shown in FIG. 4A) the lower track assembly 155, and each of the lower locking carriages 175 can roll along the outer lower track 454 (shown in FIG. 4A) of the lower track assembly 155. However, in other aspects, the upper and lower hinge carriages 140,145 can roll along the outer upper and lower tracks 256,454, respectively, and the upper and lower locking carriages 170,175 can roll along the inner upper and lower tracks, 252,452, respectively.

As such, it can be seen that, regardless of the quantity of sliding doors 100 in the sliding door system 500, the upper track assembly 150 requires no more than two tracks—a first track (e.g. the inner upper track 252) for supporting the upper hinge carriages 140 and a second track (e.g. the outer upper track 256) for supporting the upper locking carriages 170. Similarly, the lower track assembly 155 requires no more than two tracks—a first track (e.g., the inner lower track 452) for supporting the lower hinge carriages 145 and a second track (e.g., the outer lower track 454) for supporting the lower locking carriages 175.

FIG. 5 illustrates the first sliding door 100*a* in an open position and the second and third sliding doors 100*b*,100*c* in a closed positioned. Referring to the second and third sliding doors 100*b*,100*c*, in the closed position, as shown, each of the upper and lower locking pins 160,165 can be in the extended configuration, wherein the upper and lower locking pins 160,165 can engage the upper locking carriage 170 and the lower locking carriage 175, respectively. The door body 102 can be prevented from pivoting about the hinge rod 130 by the interference of upper and lower locking pins 160,165 with the upper and lower locking carriage 170,175 and upper and lower track assemblies 150,155, respectively.

Referring to the first sliding door 100*a*, in the open position, each of the upper and lower locking pins 160,165 can be in the retracted configuration. To move the upper and lower locking pins 160,165 from the extended configuration to the retracted configuration, the handle 192 can be actuated to retract the upper locking pin 160 from the upper locking carriage 170 and to retract the lower locking pin 165 from the lower locking carriage 175. For example, the handle 192 can be moved from the lowered orientation to the raised orientation, as illustrated. In the retracted configuration, the upper and lower locking pins 160,165 can clear the upper track assembly 150 and lower track assembly 155, respectively, such that the door body 102 is free to pivot about the hinge rod 130 from the closed position to the open position, and vice versa.

In some aspects, one or more connection mechanisms (not shown) can be provided for prohibiting movement of the upper locking carriage 170 of the first sliding door 100*a* in an opposite direction X' to further prevent the upper locking carriage 170 from becoming misaligned with the upper locking pin 160, while the first sliding door 100*a* is in the open position. For example, in one aspect, magnets can be provided for releasably connecting the upper locking carriage 170 to the adjacent stop block 180. The connection mechanism can be released by a user, as desired, by applying a sufficient manual force to overcome the magnetic force. In another aspect, the upper locking carriage 170 can be prevented from moving in the X' direction by a small ridge (not shown) formed on the outer upper track 256. The upper locking carriage 170 can be pushed over the ridge by manually applying a suitable force. In still other aspects, the connection mechanism can define a different construction. In some aspects, a connection mechanism can also be provided for limiting the movement of the lower locking carriage 175 in the direction X'. Furthermore, in some aspects of the sliding door system 500, a connection mechanism can also be provided for limiting movement of the upper and/or lower hinge carriages 140,145 in the direction X'.

Referring to the second sliding door 100*b*, according to example aspects, some or all of the sliding doors 100*a,b,c* can comprise a reinforcement member 504. The reinforcement member 504 can be formed from a metal material, such as steel in some aspects. In other aspects, the reinforcement member 504 can be formed from another suitable material, including, but not limited to, other types of metal, such as iron, plastic, concrete, wood, and composite materials. In the depicted aspect, the reinforcement member 504 can be housed within the door frame 106; however, in other aspects the reinforcement member 504 can be positioned outside of the door frame 106. As shown, in example aspects, the reinforcement member 504 can substantially define a C-shape and can extend proximate to the top end 114, left side 120, and bottom end 116 of the second sliding door 100*b*. Example aspects of the reinforcement member 504 can aid in preventing the second sliding door 100*b* from leaning when a manual force is applied to the handle 192. The reinforcement member 504 can further aid in preventing the second sliding door 100*b* from leaning when the second sliding door 100*b* is in the open position, wherein the right side 118 of the second sliding door 100*b* is unsupported.

Figure 6:
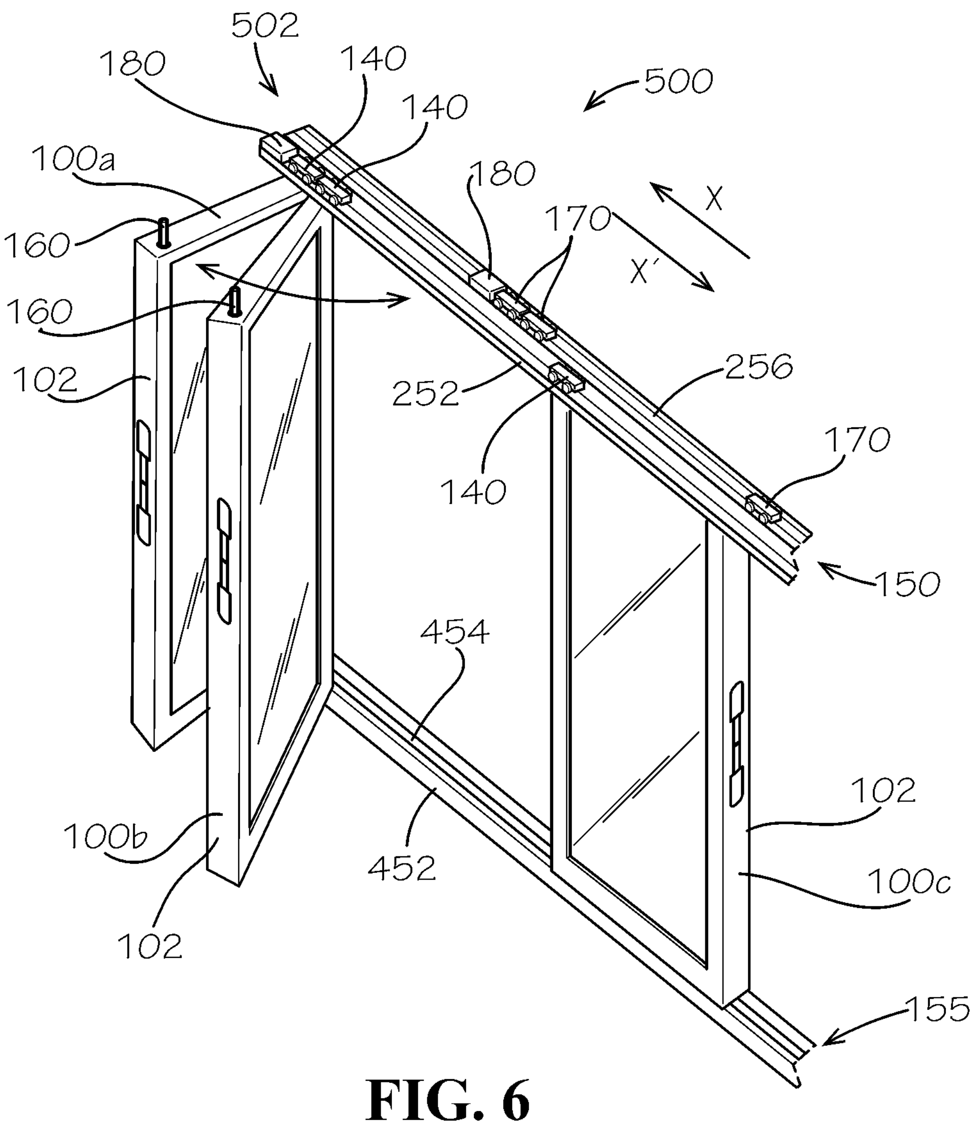
FIG. 6 is a top perspective view of the sliding door system of FIG. 5.

As further shown in FIG. 6, the second sliding door 100*b* can also slide towards the left side 502 of the sliding door system 500 to stack with the first sliding door 100*a*. With the first sliding door 100*a* in the open position, the upper hinge carriage 140 of the second sliding door 100*b* can be slid along the inner upper track 252 to abut the upper hinge carriage 140 of the first sliding door 100*a*, and the upper locking carriage 170 of the second sliding door 100*b* can be slid along the outer upper track 256 to abut the upper locking carriage 170 of the first sliding door 100*a*, as shown. Similarly, the lower hinge carriage 145 (shown in FIG. 5) of the second sliding door 100*b* can be slid along the inner lower track 452 to abut the lower hinge carriage 145 (shown in FIG. 5) of the first sliding door 100*a*. The lower locking carriage 175 (shown in FIG. 5) of the second sliding door 100*b* can abut the lower locking carriage 175 (shown in FIG. 5) of the first sliding door 100*a* in the same manner. The corresponding upper and lower locking pins 160,165 can be moved to the retracted configuration, and the door body 102 of the second sliding door 100*b* can pivot about the corresponding hinge rod 130 (shown in FIG. 5) to the open position, as described above with reference to the first sliding door 100*a*. The third sliding door 100*c*, and any additional sliding doors, can be slid in the same manner to stack with the first and second sliding door 100*a*,100*b*. Furthermore, in example aspects, adjacent upper and lower hinge carriages 140,145 and/or adjacent upper and lower locking carriages 170,175 can be releasably connected, as described in further detail below with respect to FIGS. 7A and 7B.

Figure 7A:
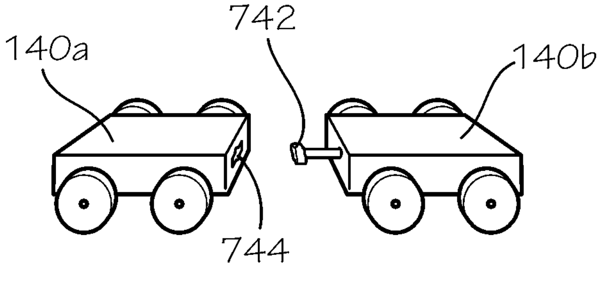
FIG. 7A is a top perspective view of a first upper hinge carriage of a first one of the sliding doors of FIG. 1 disengaged from a second upper hinge carriage of a second one of the sliding doors of FIG. 1.
Figure 7B:
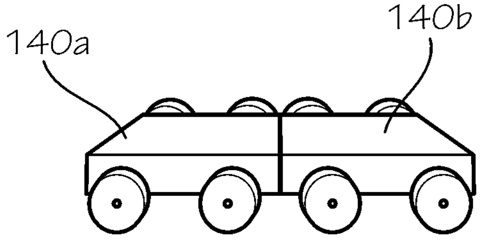
FIG. 7B is a top perspective view of the first upper hinge carriage of FIG. 7A engaged with the second upper hinge carriage of FIG. 7A.

FIG. 7A illustrates a pair of the upper hinge carriages 140*a,b* in an unconnected configuration, and FIG. 7B illustrates the pair of upper hinge carriages 140*a,b* in a connected configuration. As shown in FIG. 7A, in one aspect, the upper hinge carriage 140*a* can define a recess 744, and the upper hinge carriage 140*b* can define a key 742 for removably engaging the recess 744. According to example aspects, as shown in FIG. 7B, the upper hinge carriage 140*b* can slide towards the upper hinge carriage 140*a* until the key 742 engages the recess 744. The connection of the key 742 with the recess 744 can releasably secure the upper hinge carriages 140*a,b* together, for example, by a friction force. To disconnect the upper hinge carriages 140*a,b*, a suitable force (e.g., a manual force) can be applied to overcome the friction force. In other aspects, the adjacent upper hinge carriages 140*a,b* can be connected by other suitable connecting mechanisms known in the art; for example, the upper hinge carriages 140*a,b* can be releasably connected by magnets. To disconnect the upper hinges 140*a,b* from one another, a suitable force can be applied to overcome the magnetic force. Furthermore, in some aspects, each adjacent pair of upper locking carriages 170 can be releasably connected in substantially the same manner. Furthermore, in some aspects each adjacent pair of the lower hinge carriages 145 and/or each adjacent pair of the lower locking carriages 175 can be releasably connected in substantially the same manner.

As such, a method for using the sliding door system 500 can comprise providing the upper track assembly 150, wherein the upper track assembly 150 comprises the inner upper track 252 and the outer upper track 256 adjacent to the inner upper track 252, providing the sliding door 100, wherein the sliding door 100 comprises the door body 102, the hinge rod 130, and the upper locking pin 160, and wherein the hinge rod 130 engages the inner upper track 252 and the upper locking pin 160 removing engaging the outer upper track 256, disengaging the upper locking pin 160 from the outer upper track 256; and pivoting the door body 102 about the hinge rod 130. In some aspects, the method can further comprise sliding the upper hinge carriage 140 of the sliding door 100 along the inner upper track 252 and sliding the upper locking carriage 170 of the sliding door 100 along the outer upper track 256 to a desired location.

Figure 8:
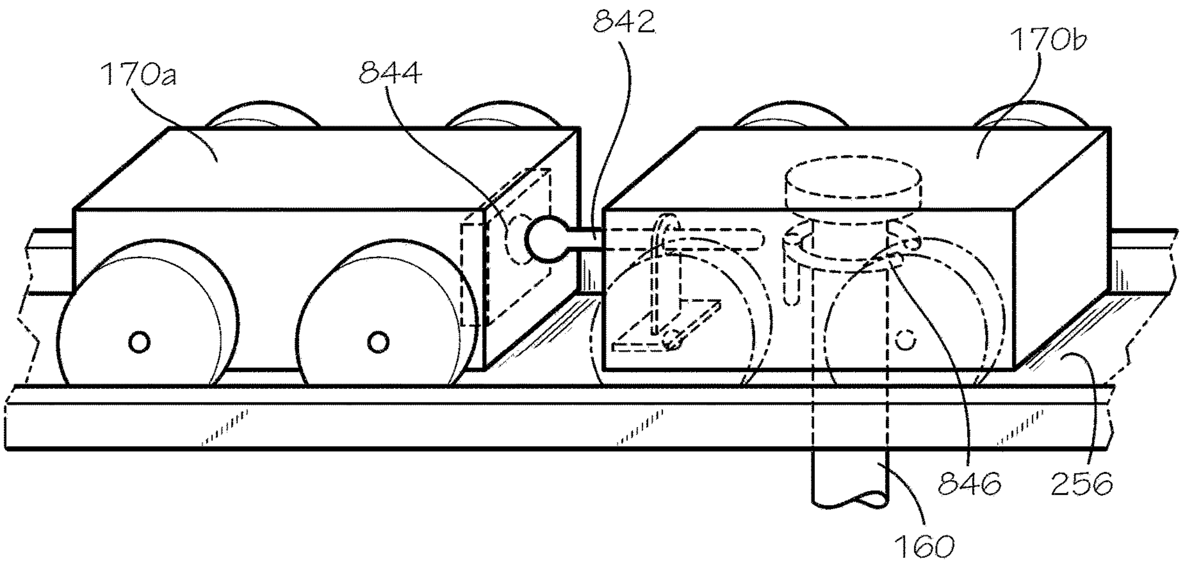
FIG. 8 is a top perspective view of a first upper locking carriage of the first one of the sliding doors of FIG. 7A and second upper locking carriage of the second one of the sliding doors of FIG. 7A, in accordance with another aspect of the present disclosure.

FIG. 8 illustrates an example aspect of the upper locking carriage 170*a* of the first sliding door 100*a* (shown in FIG. 5) and the upper locking carriage 170*b* of the second sliding door 100*b* (shown in FIG. 5). According to example aspects, the upper locking carriage 170*a* can define a recess 844 and the upper locking carriage 170*b* can define a pin 842 configured to engage the recess 844. Example aspects of the pin 842 can be slidably connected to the upper locking carriage. As shown, the pin 842 can extend partially within the upper locking carriage 170*b*. The connection of the pin 842 with the recess 844 can releasably secure the upper locking carriages 170*a,b* together, for example, by a friction force. To disconnect the upper locking carriages 170*a,b*, a suitable force (e.g., a manual force) can be applied to overcome the friction force.

According to example aspects, a clip 846 can be housed within the upper locking carriage 170*b* of the second sliding door 100*b*. The clip 846 can be configuration in an engaged orientation, as shown, wherein the clip 846 can engage the upper locking pin 160 of the second sliding door 100*b*, and a disengaged orientation, wherein the clip 846 can disengage the upper locking pin 160. In the engaged orientation, the locking pin 160 can be retained within the upper locking carriage 170*b* by the clip 846, and in the disengaged orientation, the locking pin 160 can be able to be retracted from the upper locking carriage 170*b*. In example aspects, when the pin 842 engages the recess 844, the pin can be pushed further within the upper locking carriage 170*b* and can engage the clip 846 to bias the clip 846 to the disengaged orientation, such that the upper locking pin 160 can be retracted from the upper locking carriage 170*b*.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment. It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A sliding door assembly comprising:

a track assembly comprising an inner track component, and outer track component, and a central track component, the inner track component and the central track component defining an inner track, the outer track component and the central track component defining an outer track, and the inner track defines an inner slot between the inner track component and the central track component;

a pivot assembly comprising a hinge rod and a hinge carrier, the hinge rod extends through the inner slot and engages with the hinge carrier, and the hinge carrier is engaged with and movable along the inner track;

a sliding door pivotably mounted to the pivot assembly; and a locking pin coupled to the sliding door and movable between an extended configuration and a retracted configuration, wherein, in the extended configuration, the locking pin is engaged with and movable along the outer track.

2. The sliding door assembly of claim 1, wherein:

the outer track defines an outer slot between the outer track component and the central track component;

the sliding door assembly further comprises a locking carriage configured to move along the outer track;

the locking pin extends through the outer slot and engages the locking carriage in the extended configuration; and the locking pin disengages the outer slot and the locking carriage in the retracted configuration.

3. The sliding door assembly of claim 2, wherein the inner track comprises an inner track stop block configured to limit movement of the hinge carriage along the inner track, and wherein the outer track comprise an outer track stop block configured to limit movement of the locking carriage along the outer track.

4. The sliding door of claim 1, wherein the sliding door is configured to pivot between an open position and a closed position when the locking pin is in the retracted configuration, and wherein the sliding door is retained in the closed position when the locking pin is in the extended configuration.

5. The sliding door assembly of claim 4, further comprising an actuator operatively connected to the locking pin and movable between a first orientation and a second orientation, and wherein, in the first orientation, the actuator moves the locking pin to the extended configuration, and the second orientation, the actuator moves the locking pin to the retracted configuration.

6. The sliding door assembly of claim 5, wherein the actuator is a handle coupled to the sliding door, the handle configured to be manually pivoted between the first orientation and the second orientation.

7. The sliding door assembly of claim 1, wherein:

the outer track defines an outer slot between the outer track component and the central track component;

a hole intersects the outer slot, the hole defining a width that is greater than a width of the outer slot;

the locking pin defines an upper end and a head coupled to the upper end;

the head defines a width that is greater than the width of the outer slot and less than the width of the hole; and the locking pin is movable between the extended configuration and the retracted configuration when aligned with the hole.

8. The sliding door assembly of claim 1, wherein:

the outer track is parallel with the inner track;

the sliding door defines a front side and a back side;

the sliding door defines a hinge channel that is oriented proximate to the front side and aligned with the inner track and a locking channel that is oriented proximate to the back side and aligned with the outer track; and the pivot assembly extends through the hinge channel and the locking pin extends through the locking channel.

9. The sliding door assembly of claim 1, wherein:

the track assembly is a first track assembly;

the sliding door assembly further comprises a second track assembly; and the sliding door is disposed between the first track assembly and the second track assembly; and the sliding door is movable along the second track assembly.

10. The sliding door assembly of claim 9, wherein:

the second track assembly comprises a second inner track and a second outer track:

the pivot assembly engages and moves along the second inner track;

the sliding door assembly further comprising a second locking pin movable between an extended configuration and a retracted configuration; and in the extended configuration of the second locking pin, the second locking pin is engaged with and movable along the second outer track.

11. A sliding door assembly comprising:

a track assembly comprising an inner track, and outer track, and a guide panel, the guide panel defining an inner slot aligned with the inner track and an outer slot aligned with the outer track;

a pivot assembly extending through the inner slot of the guide panel, the pivot assembly engaged with and movable along the inner track;

a sliding door comprising a door body pivotably mounted to the pivot assembly, wherein the guide panel is oriented between the door body and the inner and outer tracks; and a locking assembly coupled to the sliding door and extending through the outer slot of the guide panel, the locking assembly engaged with and movable along the outer track.

12. The sliding door assembly of claim 11, wherein:

the pivot assembly comprises a hinge rod and a hinge carriage;

the hinge carriage is configured to move along the inner track; and the hinge rod extends through the inner slot and engages the hinge carriage.

13. The sliding door assembly of claim 12, wherein:

the locking assembly comprising a locking pin and a locking carriage;

the locking pin is movable between an extended configuration and a retracted configuration;

the locking carriage is configured to move along the outer track;

in the extended configuration, the locking pin extends through the outer slot and engages the locking carriage; and in the retracted configuration, the locking pin disengages the outer slot and the locking carriage.

14. The sliding door assembly of claim 13, wherein the inner track comprises a stop block configured to limit movement of the hinge carriage along the inner track, and wherein the outer track comprise a stop block configured to limit movement of the locking carriage along the outer track.

15. The sliding door of claim 13, wherein the sliding door is configured to pivot between an open position and a closed position when the locking pin is in the retracted configuration, and wherein the sliding door is retained in the closed position when the locking pin is in the extended configuration.

16. The sliding door assembly of claim 13, further comprising an actuator operatively connected to the locking pin and movable between a first orientation and a second orientation, and wherein, in the first orientation, the actuator moves the locking pin to the extended configuration, and the second orientation, the actuator moves the locking pin to the retracted configuration.

17. The sliding door assembly of claim 16, wherein the actuator is a handle coupled to the sliding door, the handle configured to be manually pivoted between the first orientation and the second orientation.

18. The sliding door assembly of claim 11, wherein:

the track assembly is a first track assembly;

the sliding door assembly further comprises a second track assembly; and the sliding door is disposed between the first track assembly and the second track assembly; and the sliding door is movable along the second track assembly.

19. The sliding door assembly of claim 18, wherein:

the second track assembly comprises a second inner track and a second outer track:

the pivot assembly engages and moves along the second inner track; and the locking assembly engages and moves along the second outer track.

20. A sliding door assembly comprising:

a dual track assembly including a first track and a second track extending in parallel along a length of the dual track assembly;

a first pivot assembly engaged with and movable along the first track;

a first sliding door including a first door body pivotably mounted to the first pivot assembly; and a first locking assembly coupled to the first sliding door and engaged with and movable along the second track, the first sliding door is configured to decouple from the first locking assembly to pivot about the first pivot assembly to an open position a second pivot assembly engaged with and movable along the first track;

a second sliding door including a second door body pivotably mounted to the second pivot assembly;

a second locking assembly coupled to the second sliding door and engaged with and movable along the second track, and the second pivot assembly configured to move along the first track to abut the first pivot assembly, and the second locking assembly configured to move along the second track to abut the first locking assembly.

21. The sliding door assembly of claim 20, wherein the first track includes a first stop block configured to limit movement of the first pivot assembly along the first track, and the second track includes a second stop block configured to limit movement of the first locking assembly along the second track.

* * * * *